June 30, 1959     M. WEINSTOCK     2,892,452
LOAD SENSITIVE-GAS OPERATED THRUSTER
Filed May 8, 1957

INVENTOR.
MANUEL WEINSTOCK

2,892,452
LOAD SENSITIVE-GAS OPERATED THRUSTER

Manuel Weinstock, Philadelphia, Pa.

Application May 8, 1957, Serial No. 657,984

4 Claims. (Cl. 123—24)

(Granted under Title 35, U.S. Code (1952), sec. 266)

The invention described herein may be manufactured and used by or for the Government for governmental purposes without the payment of any royalty thereon.

This invention relates to thrusters adapted for use in connection with loads which it is desired to move at a relatively low velocity, and has for its principal object the provision of an improved all gas-operated thruster which operates under varying load conditions with a more nearly uniform final velocity than has been heretofore realized.

A distinguishing characteristic of this improved thruster is its ability to automatically select its mode of operation in accordance with the requirements of its load. Insofar as applicant is aware, none of the prior art thrusters have been capable of achieving this result. Another important advantage of this improved thruster is its simplicity of construction which involves no damping fluid or springs. As will appear, these highly desirable results are achieved by a programmed control of the gas flow within the thruster.

The invention will be better understood from the following description when considered in connection with the accompanying drawings and its scope is indicated by the appended claims.

Referring to the drawings.

Figure 1:
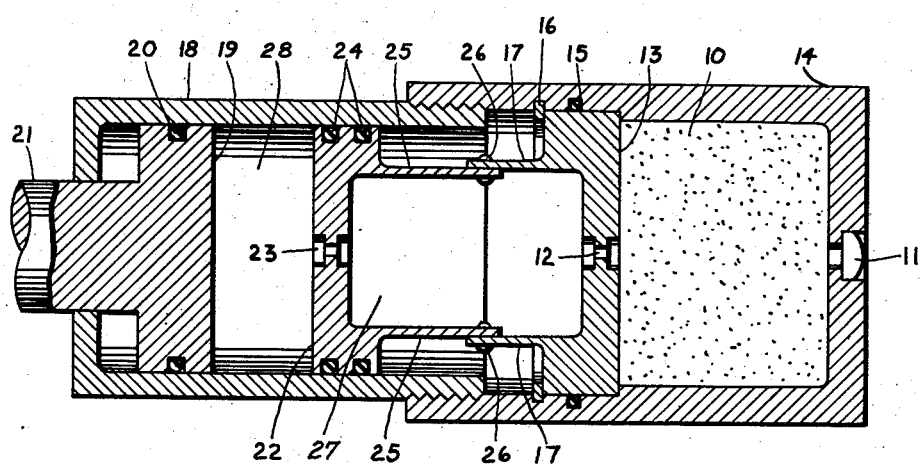
Fig. 1 is a sectional view illustrating a preferred form of the invention.

As indicated by Fig. 1, the thruster of this invention includes a combustion chamber 10 containing a charge susceptible of being fired by a primer 11. An orifice 12 is provided in the left hand wall 13 of the chamber 10, its other walls being formed by a cup-shaped member 14. It will be noted that a sealing ring 15 is interposed between the members 13 and 14, that these two members are fixed together by a snap ring 16, and that the combustion chamber wall 13 is provided with projections 17.

Threadedly attached to the left hand end of the member 14 is a cylinder 18 within which is a piston 19 having a seal ring 20 and fixed to the load actuating rod 21.

Also within the cylinder 18 is a piston 22 which has an orifice 23, sealing rings 24, and projections 25, these projections being fixed to the projections 17 by means of rivets 26. As hereinafter explained, these rivets are designed to shear in response to a predetermined pressure differential existing across the piston 22 within the chamber formed by the wall 13, the piston 22 and the members 14 and 18.

As previously indicated, the principal object of the present invention is to provide a more nearly uniform final velocity under varying conditions of external resisting force load and temperature. Basically the thruster of Fig. 1 includes (1) a combustion chamber 10 which is formed by the members 13 and 14, (2) an intermediate pressure chamber 27 which is between the piston 22 and the wall 13, and (3) a low pressure chamber 28 which is between the pistons 19 and 22. The purpose of the shear rivets 26 is to permit elimination of the intermediate chamber in response to a relatively high external resisting force load where piston 22 is moved contiguous to piston 19.

Thus with a light mass load and little or no resisting force load, this thruster will operate as a hi-intermediate-lo type thruster with resultant very low pressures acting on the main piston 19. These very low pressures result from the double restriction, orifices 12 and 23, placed in the path of the gas flow. The gas generated by burning of the propellant in the main combustion chamber 10 flows through the orifice 12 where the flow is choked due to the greater than critical pressure ratio which exists there. As the pressure builds up between the pistons 19 and 22, the flow through the orifice 23 becomes choked. The result of this double restriction in the path of the flow is to provide a very low operating pressure for the low resisting force load condition with resultant low velocities in the movement of the load.

With a light mass and a high resisting force load, the operation will proceed as before, but this time the low pressure gas forces will not be sufficient to actuate the piston 19. At this time, a pressure differential exists across the piston 22. As the pressure buildup across the piston 22 continues, this pressure differential will reach a value sufficient to shear the rivets 26. With the shearing of these rivets, the intermediate pressure chamber is eliminated and the piston 22 moves to the left until the pressures on its oposite sides are equalized. From this point on, the thruster acts as a two chamber or hi-lo thruster with a single orifice restriction and the resultant higher forces acting on the piston 19 and the high resisting external force load to which it is coupled.

Figure 2:
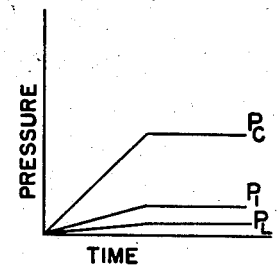
Figs. 2 and 3 are explanatory diagrams relating to the operation of the device illustrated by Fig. 1.
Figure 3:
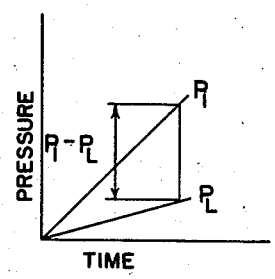

The relation between the pressures at various points in the thruster is indicated by Figs. 2 and 3 wherein pressure is plotted against time and wherein the curve $P_c$ represents the pressure in the combustion chamber, $P_i$ represents the pressure in intermediate pressure chamber and $P_L$ represents the pressure in the low pressure chamber. The resultant pressure $P_i$—$P_L$ is the pressure which exists across piston 22 and is utilized to shear the rivets 26 as explained above.

I claim:

1. A thruster including a low pressure chamber having a movable wall for moving a load, an intermediate pressure chamber having an orifice opening into said low pressure chamber, a combustion chamber having an orifice opening into said intermediate chamber, and a coupling connected between opposite walls of said intermediate chamber and severable in response to a predetermined pressure differential across said intermediate pressure chamber for equalizing the pressures in said intermediate and low pressure chambers, a wall common to said intermediate pressure chamber and low pressure chamber being movable after severance of said coupling to a position contiguous to an opposite wall of said low pressure chamber connected to a load.

2. The combination of an enclosure, means forming within said enclosure a combustion chamber having an apertured wall, a first piston having an aperture and spaced from said aperture wall to form within said enclosure and intermediate pressure chamber, means coupling said first piston to said apertured wall, said coupling means being severable in response to the application of a predetermined pressure differential across said first piston, and a second piston spaced from said first piston to form a low pressure chamber and adapted to move a load.

3. The combination of an enclosure a first piston movable within said enclosure to actuate an external load, a second piston having an aperture and spaced from said first piston to form within said enclosure a low pressure chamber, an apertured wall extending transversely of said enclosure to form a combustion chamber, and means coupling said second piston to said wall, said coupling means being severable in response to a predetermined value of said load.

4. A thruster comprising a combustion chamber, a low pressure chamber, an intermediate pressure chamber having a wall common to said combustion chamber and having an orifice therein and a wall common to said low pressure chamber also provided with an orifice therein, a wall of said low pressure chamber opposite its orificed wall being for connection to a load, and means responsive to a predetermined pressure in said intermediate pressure chamber for rupturing the same and moving the orificed wall common to said intermediate and low pressure chambers to a position contiguous to the opposite low pressure chamber wall whereby a greater pressure may be applied to a load sooner than would be the case were said intermediate pressure chamber not ruptured.

References Cited in the file of this patent

UNITED STATES PATENTS

| 2,750,886 | Filstrup | June 19, 1956 |
| 2,815,008 | Hirt | Dec. 3, 1957 |

FOREIGN PATENTS

| 685,964 | France | July 21, 1930 |